(12) United States Patent
Kim et al.

(10) Patent No.: US 6,802,010 B1
(45) Date of Patent: Oct. 5, 2004

(54) MULTIPLE USER COMPUTER SYSTEM AND METHOD FOR REMOTE CONTROL THEREOF

(75) Inventors: Hong-Sam Kim, Yongin-shi (KR); Hae-Jin Hwang, Suwon (KR); Du-Il Kim, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 09/534,440

(22) Filed: Mar. 24, 2000

(30) Foreign Application Priority Data

Mar. 26, 1999 (KR) ........................................ 1999-10578

(51) Int. Cl.[7] .............................. H04L 9/32; G06F 1/30
(52) U.S. Cl. ...................................... 713/200; 713/310
(58) Field of Search ........................................ 713/200

(56) References Cited

U.S. PATENT DOCUMENTS 5,960,085 A * 9/1999 de la Huerga ............. 340/5.61
6,119,228 A * 9/2000 Angelo et al. .............. 713/180

* cited by examiner

*Primary Examiner*—Gregory Morse
*Assistant Examiner*—Jacob Lipman
(74) *Attorney, Agent, or Firm*—Robert E. Bushnell

(57) ABSTRACT

A multiple-user computer system provides a respective remote control device to each one of a plurality of multiple users. Each remote control device has a plurality of button switches and a memory for storing a password datum, and transmits a remote-control wireless signal including a password datum to a wireless receiving panel of a computer in response to an input of a button switch. The wireless receiving panel has a memory for storing passwords provided to each of the multiple users. The panel receives a wireless signal from a remote controller, and compares a password of the remote controller included in the wireless signal with passwords of the multiple users stored in the memory. If passwords match, the system is controlled in response to the remote control signal. Using the remote control, a user can utilize a computer system, convert it to a sleep mode, wake it up from a sleep mode, and execute designated application programs.

20 Claims, 15 Drawing Sheets

Packet Data 470

MULTIPLE USER COMPUTER SYSTEM AND METHOD FOR REMOTE CONTROL THEREOF

CLAIM OF PRIORITY

This application makes reference to, incorporates the same herein, and claims all benefits accruing under 35 U.S.C. §119 from the inventor's application MULTIUSER COMPUTER SYSTEM AND REMOTE CONTROL METHOD THEREOF filed with the Korean Industrial Property Office on 26 Mar. 1999 and there duly assigned Ser. No. 10578/1999.

BACKGROUND OF THE INVENTION

1. Field of the Invention

The present invention relates to a computer system and, more particularly, to a multi-user computer system having a remote control device. The invention also concerns a method for remote-control operation of the computer system of the invention.

2. Related Art

Typically, a computer system (PC) is used as an information handling system. Typically, such a computer system comprises a central processing unit (CPU), a volatile memory (RAM), a nonvolatile memory (ROM), a display monitor, a keyboard, a pointing input device (mouse), a CD-ROM drive, a modem, a hard disk drive (HDD), and a printer. A main printed circuit board (PCB) of the computer system, often referred to as a motherboard, connects these components and coordinates their utilization.

The CPU of a PC is ordinarily a microprocessor semiconductor chip such as a 486, 586, Pentium®, or the like. Advances in semiconductor technology have resulted in rapidly increasing performance of semiconductor memory devices and other PC components. This has led to replacement of single-user PC operating systems by multiple PC user operating systems. For example, the Microsoft Windows® operating systems support multiple-user configurations for PCs.

The user interfaces for executing application programs installed in computer systems or for inputting commands or data to applications programs usually consist of a keyboard and a mouse as input devices. For convenient use of frequently used application programs, PCs may have a front control panel with several buttons, so-called "Easy Buttons" or "Q Buttons". Such a button may be associated with a remote control device ("remote control"). Each such button of a control panel or a remote control corresponds to a special function of a computer or a normal application program. A user, by pressing the button, can open or close an application program. The user can also remotely control the PC by use of such a remote control.

A PC so equipped provides a more convenient user interface along with improved performance. However, the user interface system of a multiple-user computer system of this type still has some suboptimal aspects.

First, in order to execute an application program installed in the PC, the user has to wait while the system activates itself after a power on. The hardware is booted by the PC's BIOS (basic input/output system) and then the software booting procedure occurs in the operating system. Only after these system activation and BIOS boot-up procedures have been completed can the user select and execute a desired application program. Although a general operating system can automatically execute a designated specific application program after boot-up, a program that will automatically be executed in a PC with a remotely controlled multiple-user system cannot do this. This is because the first program may differ according to different user's requirements.

Moreover, when a password inspection function for log-on to the operating system is required in the computer system (as is typical in networked PCs), a user must input a password, perhaps several times before using the PC. Although security requirements are thereby satisfied, the computer system cannot rapidly be placed into use.

Further, when one user uses a computer system, another user might attempt to control the system by a remote controller. In that case, a second computer system user could interfere with the work of a previous computer system user. This rules out use of remote control in present systems. Ordinarily, therefore, a remote control cannot effectively be applied to a multi-user system.

SUMMARY OF THE INVENTION

It is therefore an object of the present invention to provide a multiple-user computer system having a plurality of remote control devices corresponding to a plurality of users.

In one embodiment of the invention, a multiple user system comprises (a) a plurality of remote wireless controllers outputting a remote control signal including a control code for remote control, with different password data for each of the multiple users (a unique password datum is associated with each one of the authorized multiple users); and (b) a wireless receiving panel, connected to the PC, receiving a remote-control wireless signal (for example, an infrared, sonic, or radio signal) from the remote controllers. When a password included in a received remote control signal is detected to be associated with an authorized user, because remote-control data corresponding to a predetermined code is included in the received remote-control signal, then the PC is permitted to receive the remote-control data and then the PC executes computer program operations corresponding to the remote-control data.

In this embodiment, the remote controller comprises a memory unit for storing the password data; at least one switch unit for remote control of the system; a control unit, connected to at least one switch unit; and a wireless (infrared, etc.) transmitter, connected to the control unit, to send (emit) a remote control wireless signal.

In this embodiment, the remote receiving panel at the PC comprises a wireless receiver for receiving a wireless signal from the remote controller. The wireless signal is converted into an electrical signal. The panel also contains a memory unit for storing each password of the authorized multiple users; and a control unit, connected to the wireless receiver and the memory unit, for receiving a remote control signal through the wireless receiver. If a password included in the remote-control signal matches one of the passwords stored in the memory unit, remote-control data is generated corresponding to a control code included in the remote control signal and is sent to the PC. That is, upon detection of a proper password datum signal, the control unit "enables" transmittal of a code to the PC that causes the PC to execute a computer program operation.

In another embodiment of the invention, there are a plurality of remote controllers assigned to multiple-users. A multiple user system receives a remote-control signal from the remote control to be operated. The PC control panel detects whether the remote-control signal includes password data for an authorized multiple users and control code data for remote control is received. The password data included in the received remote control signal is inspected with a detector to detect whether the user is authorized. If the remote control signal is received from an authorized user, system operation (computer program operations) is executed corresponding to a control code included in the received remote-control signal.

BRIEF DESCRIPTION OF THE DRAWINGS

A more complete appreciation of the invention, and many of the attendant advantages thereof, will be readily apparent and understood by reference to the following detailed description when considered in conjunction with the accompanying drawings in which like reference symbols indicate the same or similar components.

DESCRIPTION OF THE PREFERRED EMBODIMENT

Preferred embodiments of the invention are now described with reference to the accompanying drawings.

Figure 1:
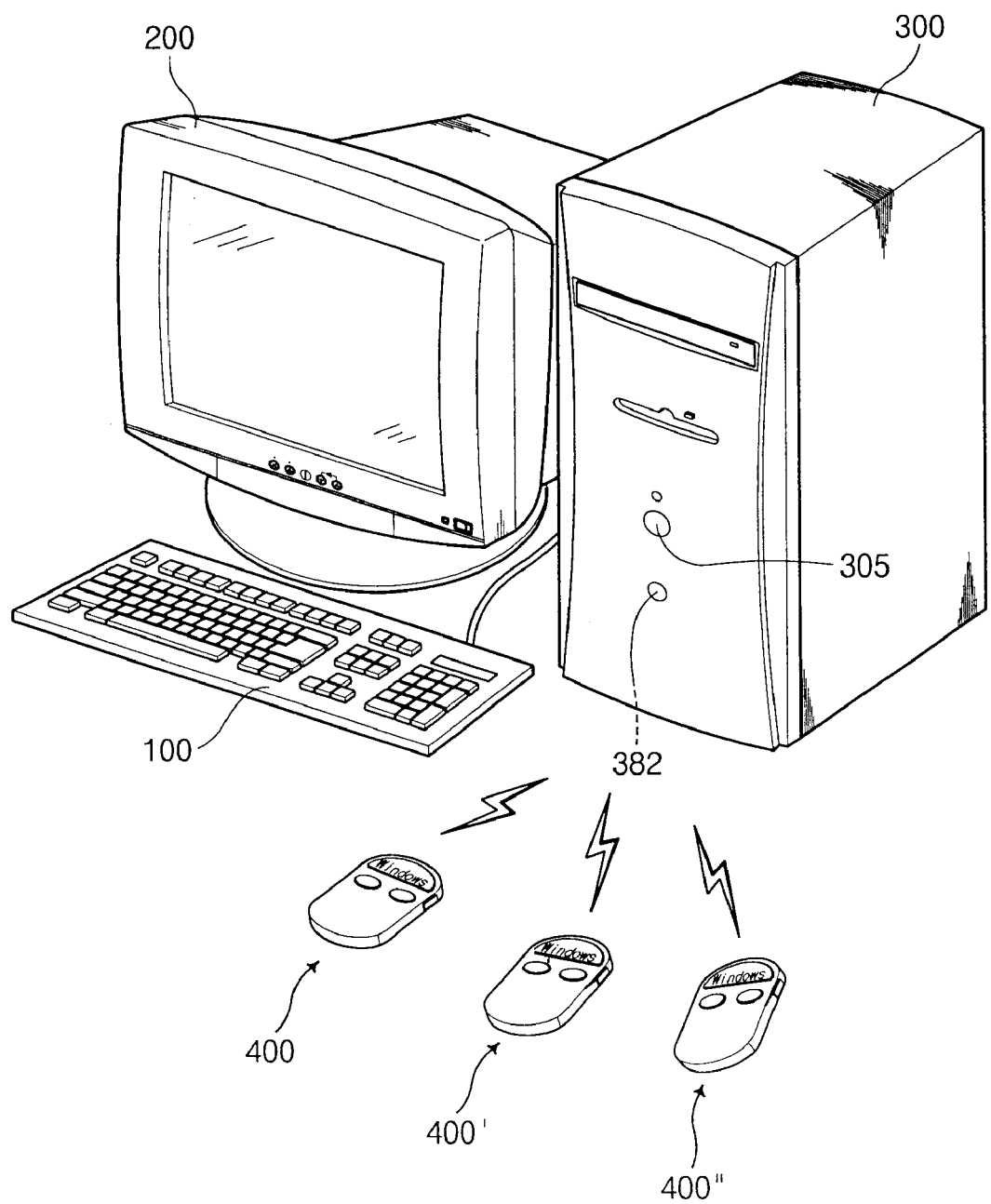
FIG. 1 is a perspective view showing a computer system and a remote controller wirelessly connected thereto according to one embodiment of the invention.

Referring now to FIG. 1, a multiple-user computer system in accordance with the invention has a plurality of remote control devices that are related to a plurality of users. Each remote control device ("remote control") has inherent password data and transmits a remote-control wireless signal (infrared, sound, radio, etc.), including the inherent password data, to a computer or system body (PC). A wireless reception panel installed in the system body receives a remote control signal, and inspects it for a password to enable only a proper user to remotely control the computer system. When the remote control powers on the system, password check by the BIOS is skipped and log-on to the PC operating system is automatically carried out.

FIG. 1 illustrates a computer system and a remote control device connected by wireless means thereto per the embodiment of the invention. Referring now to FIG. 1, a computer system (PC) has a system body 300 where a power button switch 305 and a wireless receiver 382 are mounted upon a front bezel thereof. The system has a keyboard 100 and a display monitor 200 that are connected thereto, as typical input/output means. A remote control 400 is coupled by wireless means to the wireless receiver 382 of the body 300. The wireless receiver 382 is mounted upon the front bezel of the body 300. The remote control 400 has at least one or more button switches for remote control. One button switch is allocated for power-on/sleep/wake-up. The other button switches correspond to specific application programs stored in the system body, respectively. The wireless signal of this embodiment may be an infrared signal, a sonar signal, a radio signal, or other appropriate wireless signal.

Shell programs related to the remote control 400 are stored in the computer system, and allow a user to register application programs requiring auto-execution. The shell program senses an input of the remote control 400, executing a corresponding application program. The remote control 400 and the shell programs are provided to a specific interface that is used to power on the computer system, to convert the system into a sleep mode, to wake the system from the sleep mode, and to execute computer program operations of one of the many application programs stored in the system. The computer system may use Microsoft Windows 98® as an operating system. System power management may support "ACPI (Advanced Configuration Power Interface) Specification Version 1.0" suggested by Microsoft®, Intel®, and Toshiba®.

A power button switch 305 mounted upon a front bezel of a system body 300 is a so-called "soft switch" for power-on/off of a computer system and sleep/wake-up function. Pressing switch 305 for at least 4 seconds causes the computer system to perform a power-on operation. Pressing switch 305 for less than 4 seconds in the power-on status causes the system to go into a sleep mode (step S3 of the ACPI). A switch input in the sleep mode leads to wake-up of the system so that it is converted into a normal mode (step S0 of the ACPI).

A number of proper users can share and use a multiple-user computer system of this invention. Each remote control 400, 400', 400" having an inherent password is provided to each of the users. Each of the users can remotely control a computer system using his own remote control 400, 400' or 400", and each user can drive a required application program during remote drive. When the system is normally operated, a user can execute a registered application program by using the remote control 400 or convert the system into a sleep mode. Also, the user can wake up the system from the sleep mode. When one user is using the system, no other user can control the system.

Figure 2A:
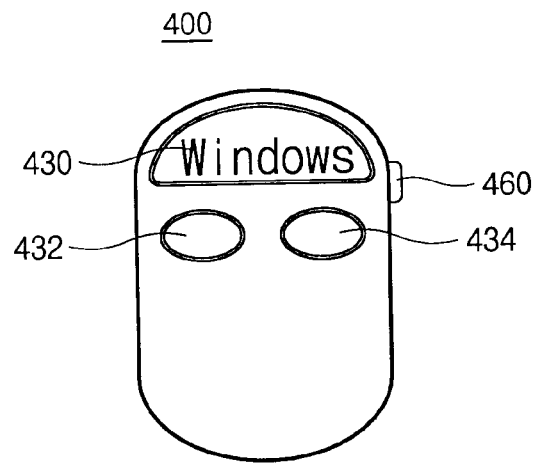
FIG. 2A is a diagram showing of a remote control device according to the invention of FIG. 1.
Figure 2B:
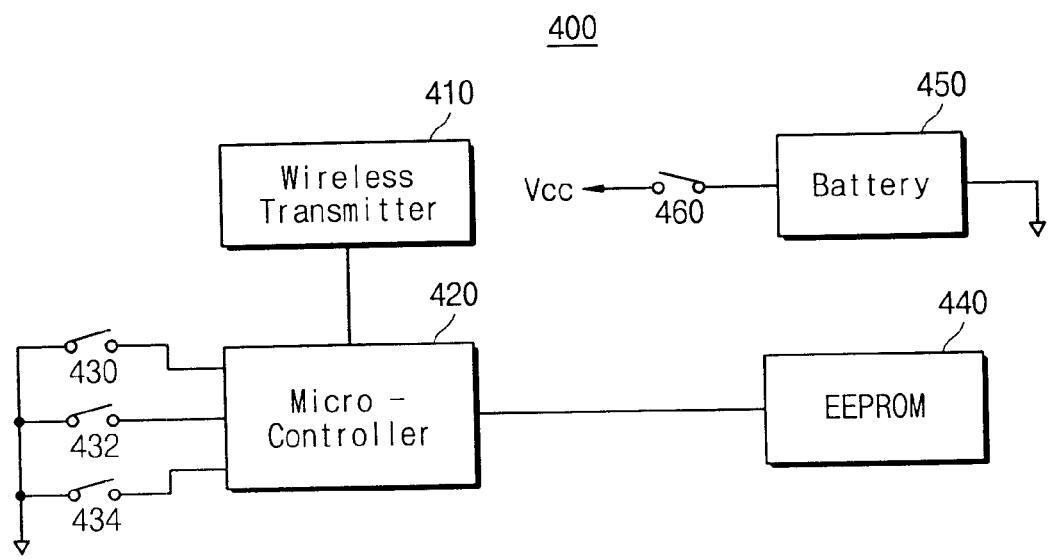
FIG. 2B is a block diagram showing a circuit structure of the same remote control device.

FIG. 2A illustrates a remote control. FIG. 2B illustrates a circuit structure of the remote control of FIG. 2A. A plurality of button switches 430, 432, and 434 are located on an upper portion of a remote control 400, and a power button switch 460 for power-on/off is located on one end thereof. Referring now to FIG. 2B, the remote control 400 comprises a wireless transmitter 410, a microcontroller 420, button switches 430, 432, and 434, an EEPROM 440, a battery 450, and a power button switch 460. The button switches 430, 432, and 434, the wireless receiver 410, and the EEPROM 440 are connected to the microcontroller 420. The power button switch 460 is connected to the battery 450 and switches power supply to each circuit structure.

Multiple users of the computer system have the remote controls 400, 400', and 400", respectively. Each of EEPROMs 440, 440', and 440" included in the remote controls 400, 400', and 400" stores a password corresponding to one of the respective users. In addition, all of the passwords corresponding to the multiple users are stored in an EEPROM included in a remote signal receiver of the computer system (shown in FIG. 6), which will be described more fully below.

Referring now to FIG. 2A, the first button 430 is used for performing a power management function and/or executing a Windows program in response to the power status of the computer system. For example, if the first button switch is selected when the computer system is in a power off status, the computer system is powered on and the Windows program is automatically executed. Moreover, if the first button switch is selected when the computer system is in sleep mode (i.e., power-saving mode), the computer system is awaken, and if the first button switch is selected when the computer system is in a normal status, the computer system enters a sleep mode. The second and the third button switches 432 and 434 are used for booting the computer system and/or performing predetermined programs. For example, if the second or the third button switch 432 or 434 is selected when the computer system is in the normal mode, the predetermined program corresponding to the selected button switch is executed. And if the second or the third button switch 432 or 434 is selected when the computer system is in power-off status, the computer system is powered on and the predetermined program corresponding to the selected button switch is executed. In that case, the number of button switches for performing the predetermined programs is restricted to two, but the number of button switches can be increased. Since using too many button switches confuses the users, the number of button switches should be limited.

Figure 3:
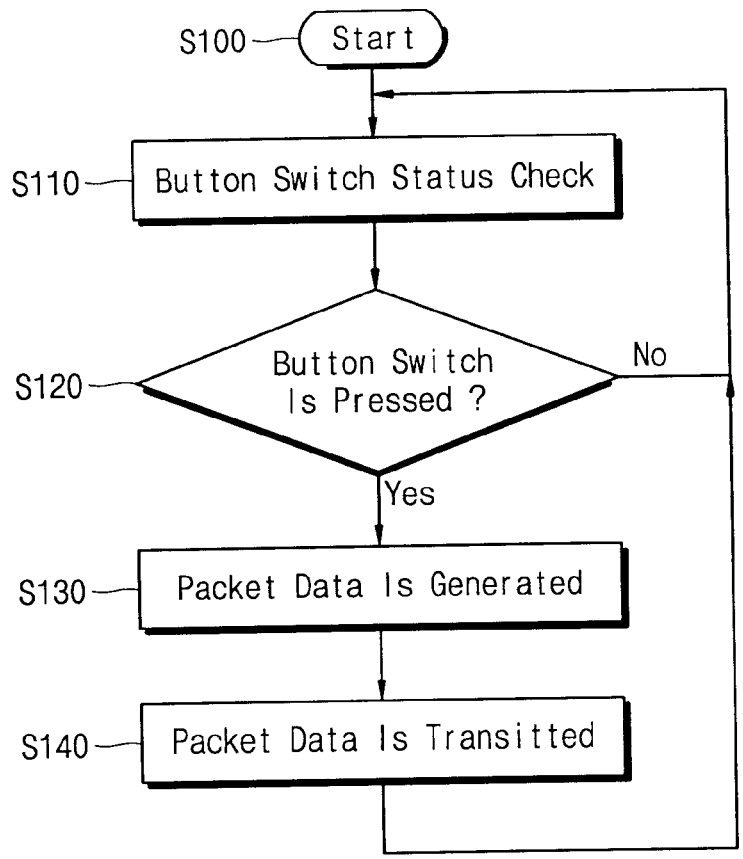
FIG. 3 is a flowchart showing the operation steps of a microcontroller per FIG. 2.
Figure 4:
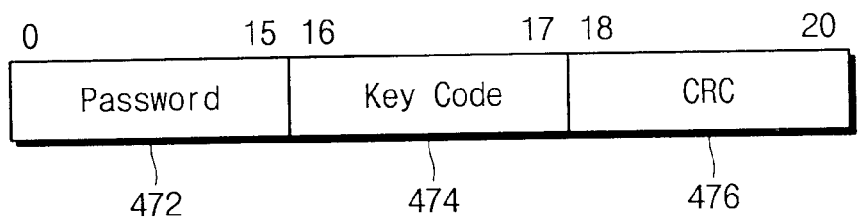
FIG. 4 is a diagram showing a packet data structure for wireless transmission.

FIG. 3 illustrates the operating steps of a microcontroller of FIG. 2. Starting control in step S100, microcontroller 420 checks the status of a plurality of button switches 430, 432, and 434 in step S110. In step S120, the microcontroller 420 determines whether there is an input of a button switch. If the input is generated, packet data is generated in step S130. In step S140, the packet data is transmitted to system body 300 via wireless transmitter 410. An example of packet data generated by a microcontroller 420 is illustrated in FIG. 4. Referring now to FIG. 4, packet data 470 comprises a password 472 of 16 bits, a key code 474 of 2 bits, and CRC (cyclic redundancy check) data 476 of 3 bits. The password 472 is inherent password data, stored in an EEPROM 440, of each user, the key code 474 is data corresponding to an inputted button switch, and the CRC data 476 is data for detecting transmission error. The packet data 470 is only one example and a variety of wireless transmission/reception protocols can be applied for more exact wireless transmission/reception.

Figure 5:
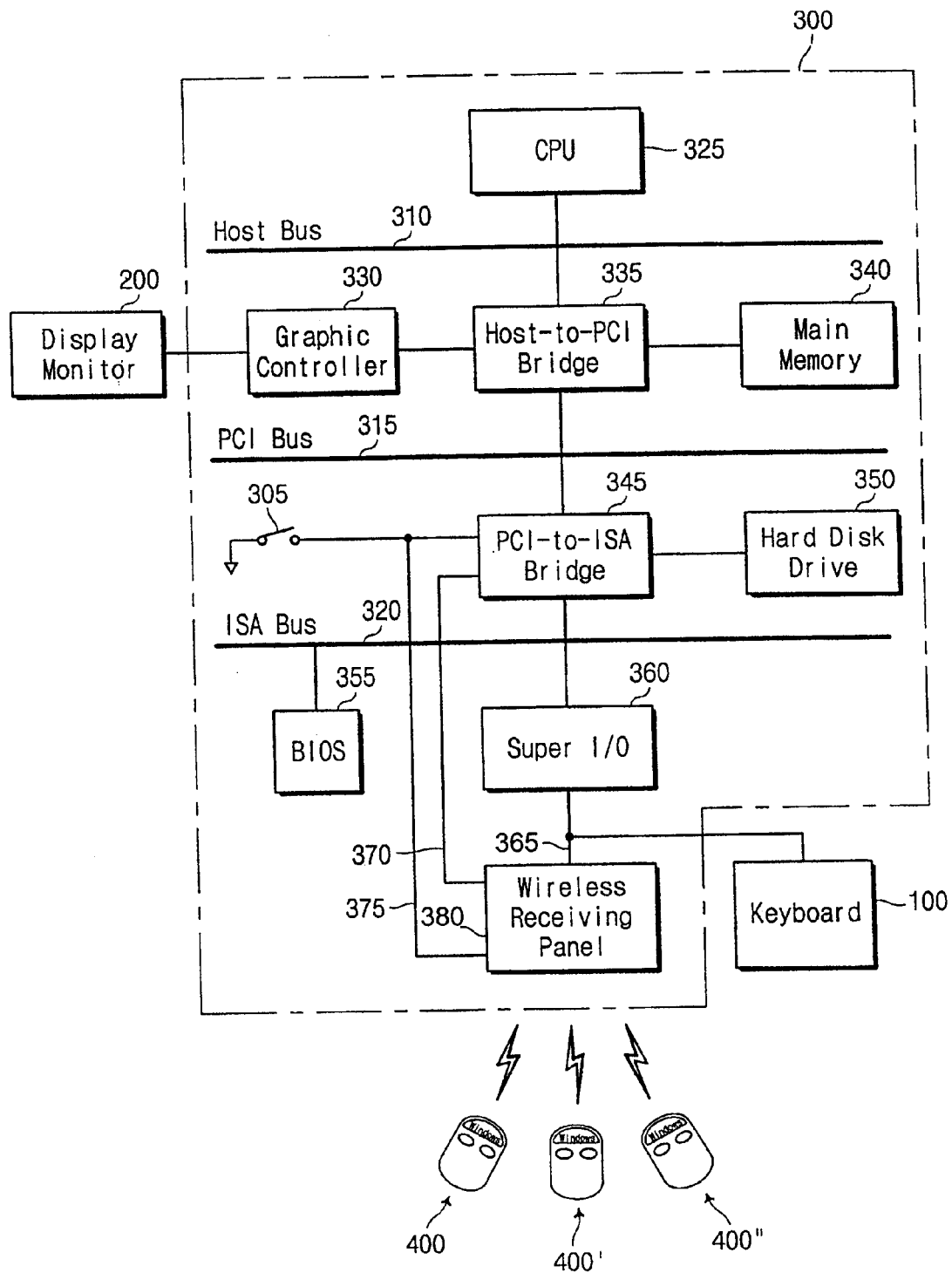
FIG. 5 is a block diagram showing a circuit structure of a computer system per FIG. 1.

FIG. 5 illustrates a circuit structure of a computer system of FIG. 1. A computer system of the invention includes a Host bus 310, a PCI (peripheral component interconnect) bus 315, and an ISA (industry standard architecture) bus 320. The computer system comprises a CPU 325 connected to the host bus 310, a Host-to-PCI bridge 335 connected between the Host bus 310 and the PCS bus 315, a graphic controller 330 connected to the Host-to-PCI bridge 335, and a main memory 340. A display monitor 200 is connected to the graphic controller 330. The computer system further comprises a PCI-to-ISA bridge 345 connected between the PCI bus 315 and the ISA bus 320, and a hard disk drive 350 connected to the PCI-to-ISA bridge 345. The computer system further comprises a BIOS (basic input/output system) 355 and a super I/O (super input/output) 360, which are connected to the ISA bus 320. An audio controller (not shown) is adapted to be connected to a speaker system (not shown) and a microphone (not shown). A wireless receiving panel 380 of this invention is connected to the super I/O 360 and the PCI-to-ISA bridge 345, respectively. Although not shown, a cache memory, a floppy disk drive, a CD-ROM drive, and a power supply are advantageously included in the computer system.

The Host-to-PCI bridge 335 controls a memory, graphic interface, and a Host-to-PCI bus interface, as is well known. In general, the Host-to-PCI bridge 335 is a kind of a chip set, called "a system controller," such as an Intel 82443BX PCI/A.G.P controller (PAC). A main memory generally comprises a DRAM (dynamic random access memory). It is well known that a PCI-to-ISA bridge 345 controls a PCI-to-ISA bus interface, an IDE (integrated development environment) interface, system power management, GPIO (general purpose input-output), DMA (direct memory access), and USB (universal serial bus). An example of a PCI-to-ISA bridge 345 is the Intel 82371EB PCI ISA IDE Xcelerator (PIIX4E). The super I/O 360 is known to control a keyboard, a serial/parallel input-output, and a floppy disk drive. An example of a super I/O 360 is the SMC FDC37C777 I/O Controller.

A wireless receiving panel 380 receives system status information through a signal line 370 connected to a GPO (general purpose output) terminal of the PCI-to-ISA bridge 345. The panel 380 receives a wireless signal from a remote control 400, and inputs a power control signal for converting the system status into a power-on or a sleep mode to the PCI-to-ISA bridge 345 through a signal line 375. A system power manager (not shown) in the PCI-to-ISA bridge powers on/off or sleeps/wakes up the system in response to a power control signal inputted from a power button switch 305 or a wireless receiving panel 380. The wireless receiving panel 380 generates a key scan code corresponding to inputs of button switches 430, 432, and 434 and then inputs the generated code to super I/O 360 through signal line 365. A keyboard controller (not shown) in the super I/O 360 processes the inputted key scan code in a manner similar to the processing steps of a general key input. The signal line 365 is a keyboard clock connected to a keyboard 100, and a data line. The wireless receiving panel 380 generates the key scan code used in the system. The following "TABLE 1" exemplifies one combination of a key scan code which is applied in this embodiment.

TABLE 1

|  | Key Scan Code | Keyboard Key Combination |
| --- | --- | --- |
| Button Switch 430 | E0 1F 14 11 15 E0 F0 14 F0 11 F0 15 | CTRT + WIN + ALT + Q |
| Button Switch 432 | E0 1F 14 11 1D E0 F0 14 F0 11 F0 1D | CTRT + WIN + ALT + W |
| Button Switch 434 | E0 1F 14 11 24 E0 F0 14 F0 11 F0 24 | CTRT + WIN + ALT + E |

Figure 6:
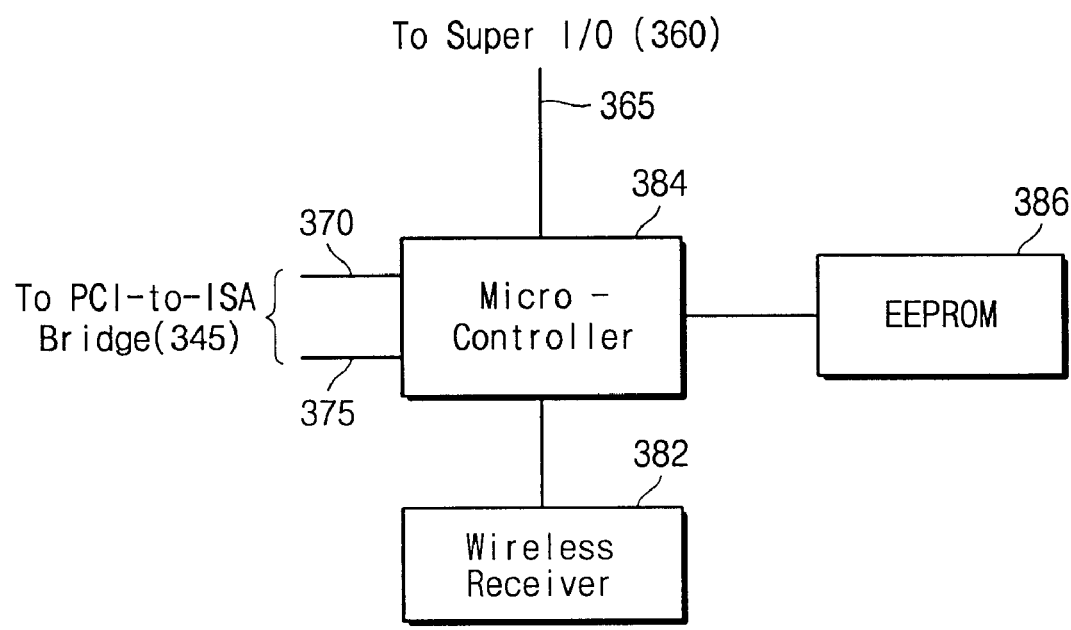
FIG. 6 is a block diagram showing a circuit structure of a wireless reception panel per FIG. 5.
Figure 7:
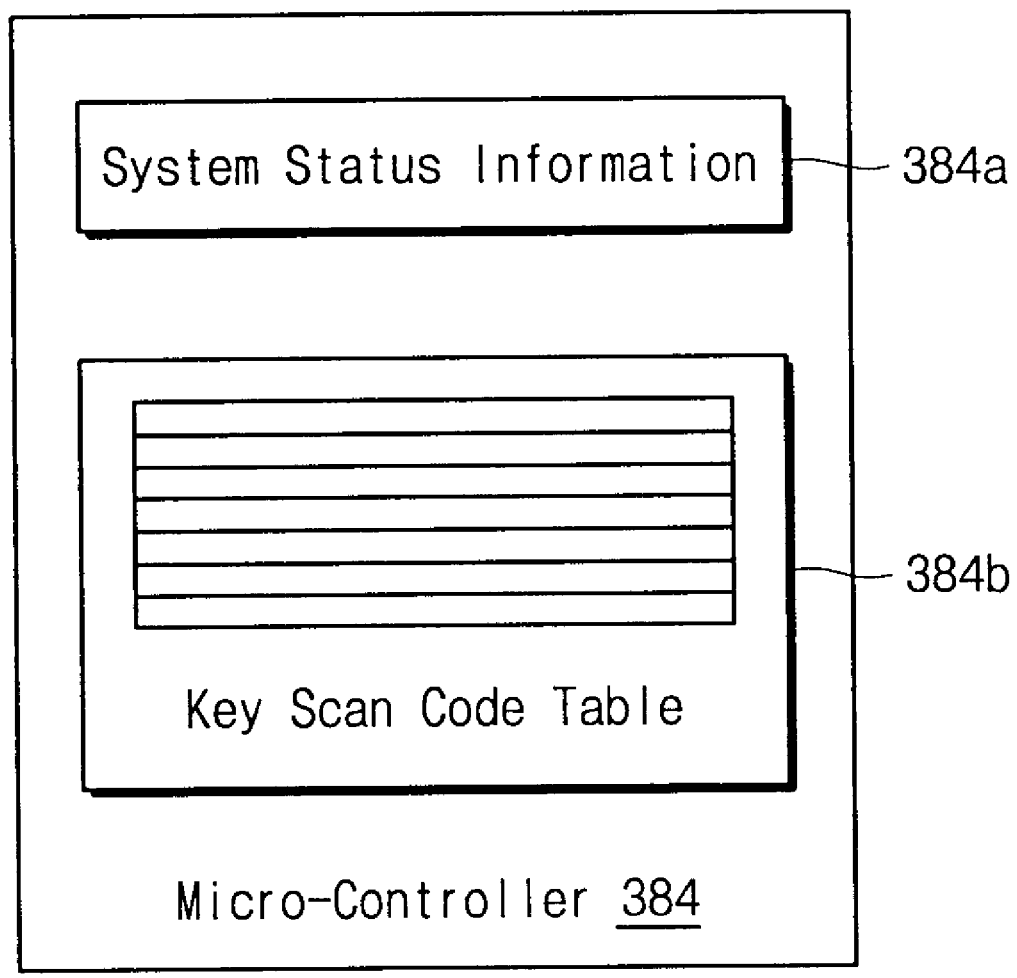
FIG. 7 is a diagram showing an internal register of a microcontroller per FIG. 6.

FIG. 6 illustrates a circuit structure of a wireless receiving panel of FIG. 5, and FIG. 7 illustrates an internal register of a microcontroller. Referring now to FIG. 6, a wireless receiving panel 380 comprises a wireless receiver 382, a microcontroller 384, and an EEPROM 386. The wireless receiver 382 and the EEPROM 386 are connected to the microcotroller 384, respectively. The wireless receiver 382 receives a wireless signal transmitted from a remote control 400, converts it into an electric signal, and inputs it to the microcontroller 384. Passwords of respective multiple users and user codes corresponding to each of the passwords are stored in the EEPROM 384. As shown in FIG. 7, the microcontroller 384 includes a register 384a for storing system status information, a key scan code table 384b storing key scan codes, and an output terminal for outputting key scan code data and a keyboard clock to the super I/O 360. The microcontroller 384 further includes an output terminal for outputting a power control signal to/from the PCI-to-ISA bridge 345 and input terminals for receiving system status information. The microcontroller 384 is KS57C0504N of Samsung Electronics Co., Ltd. in this embodiment.

Figure 8:
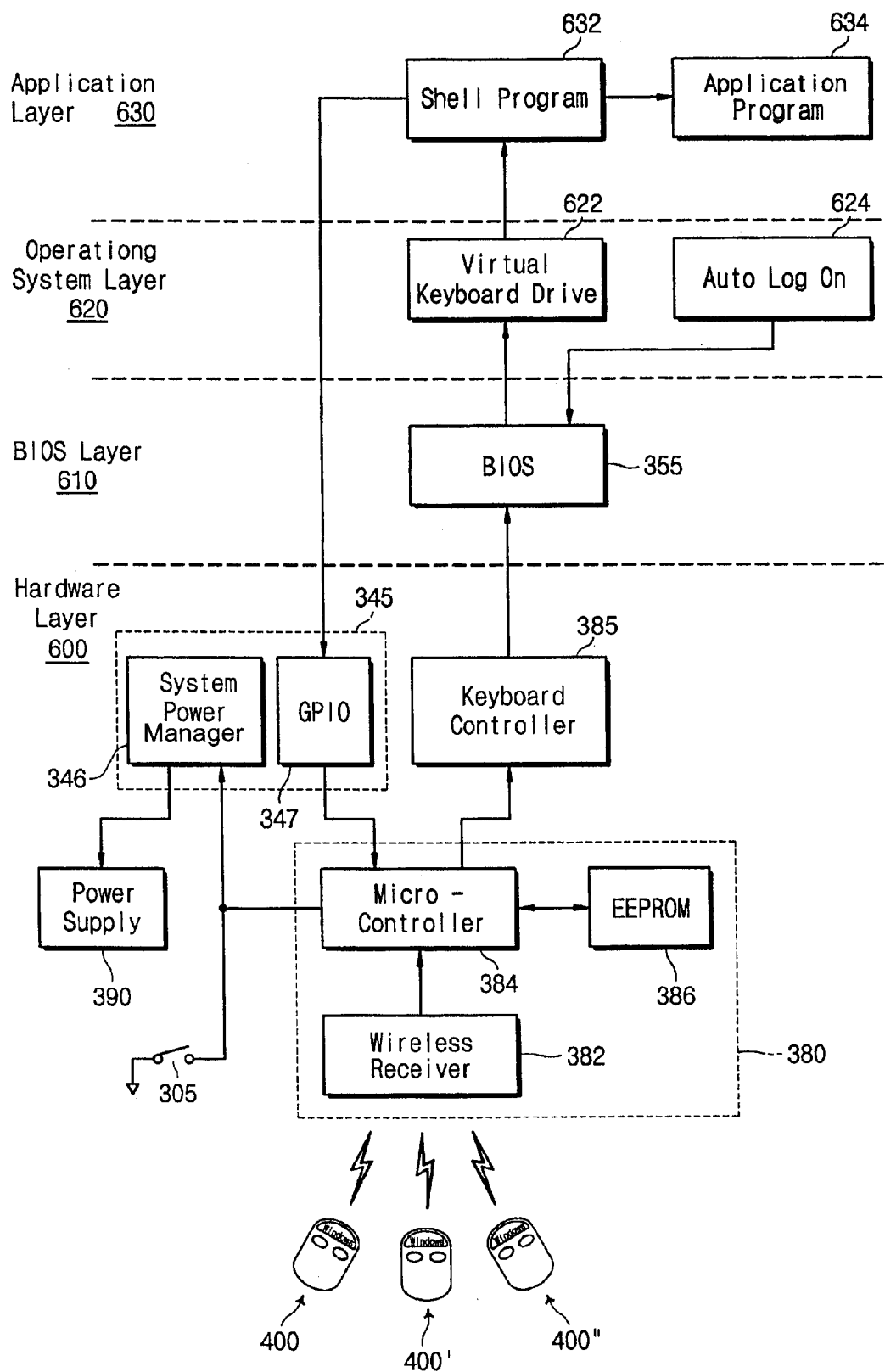
FIG. 8 is a diagram showing a wireless reception panel of a computer system shown in FIG. 5 and an interface model of a shell program related thereto.

FIG. 8 illustrates a wireless receiving panel of a computer system and an interface model of a shell program related to the panel. Referring now to FIG. 8, a computer system has a hardware layer 600, a BIOS layer 610, an operating system layer 620, and an application program layer 630. The following is the description of both a remote control 400 and parts related to remote control. The hardware layer 600 includes a system power manager 346 and a GPIO 347 in a PCI-to-ISA bridge 345, a keyboard controller 385 in a super I/O 360, a power supply 390, and a wireless receiving panel 380. The BIOS layer 610 includes a BIOS 355. The operating system layer 620 includes an operating system (not shown), a virtual keyboard driver 622, and an auto log-on program 624. The application program layer 630 includes a shell program and a variety of application program that are related to the remote control 400.

The microcontroller 384 receives a wireless signal transmitted from the remote control 400 through a wireless receiver 382. If the signal is the only wireless signal inputted from one of multiple users, the microcontroller 384 performs a corresponding operation. Microcontroller 384 inputs a signal related to power control to the power manager 346 or inputs a key-scan code to the keyboard controller 365. In addition, microcontroller 384 receives system status information through the GPIO 365 from a shell program 632. The key-scan code inputted to the keyboard controller 385 is inputted to a virtual keyboard driver 622 by means of the BIOS 355. The virtual keyboard driver 622 checks whether the inputted key-scan code is a key-scan code allotted to the remote control 400. If so, the key-scan code is inputted to the shell program 632. The shell program 632 then executes an application program 634 selected by the remote control 400. An auto log-on program 624 automatically logs on the operating system to a corresponding one of the multiple users when the computer system is remotely controlled by means of the remote control 400. The shell program 632 and the auto log-on program 624 will be described more fully below. The system power manager 346 receives a power control signal from a power button switch 305 and the microcontroller 384, controlling a power supply 390. The system power manager 346 supports the ACPI standard.

Figure 9A:
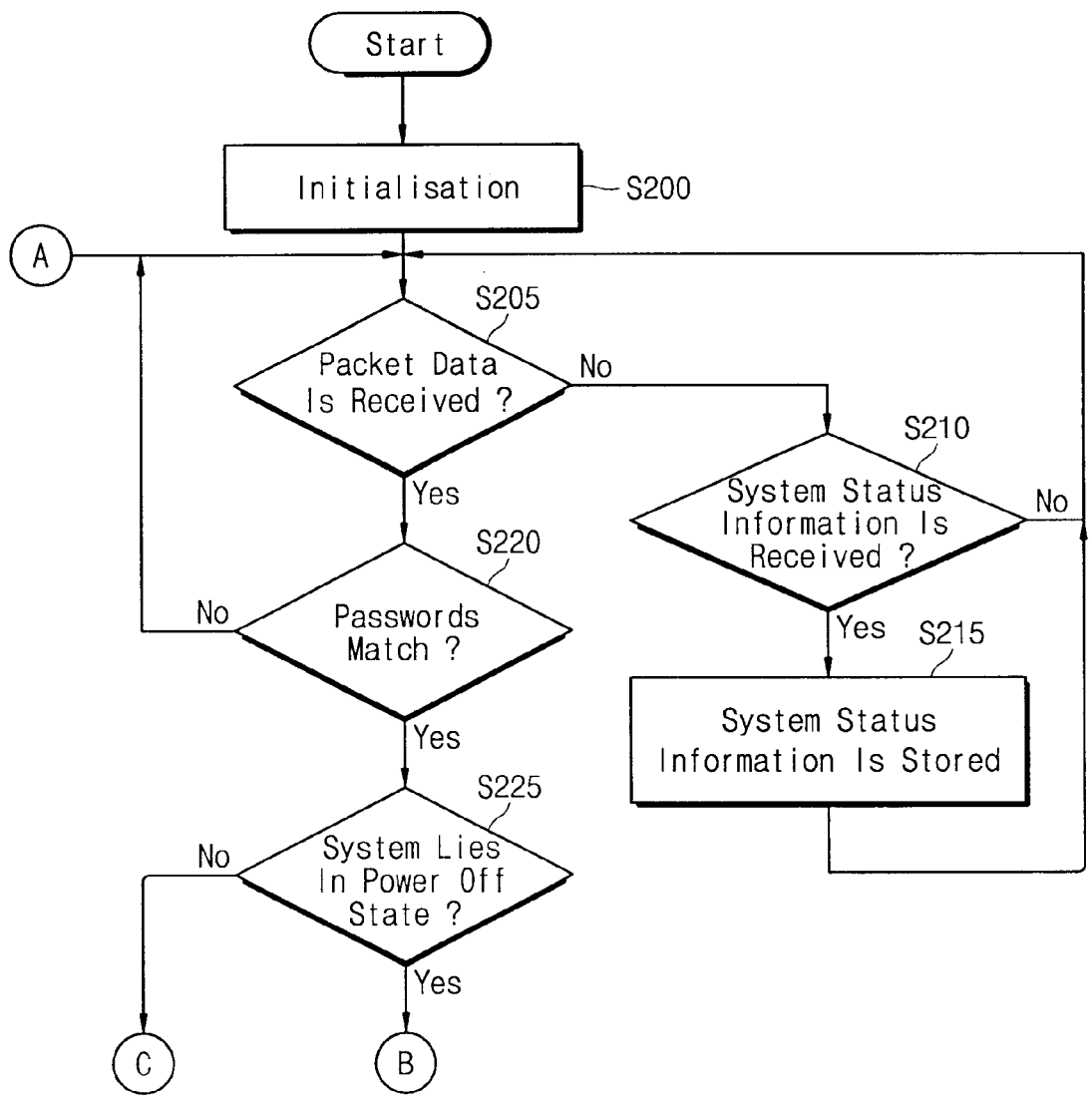
FIG. 9 flowchart showing the operation steps of a microcontroller per FIG. 6.

FIG. 9A illustrates operation steps of a microcontroller of FIG. 6. Referring now to FIG. 9A, in step S 200, a microcontroller 384 performs an initialization operation for initializing an internal register when operation power is supplied. If a power supply 390 receives external power, a wireless receiving panel 380 and the system power manager 346 always receive power. In step S205, the microcontroller 384 detects whether packet data is received from a remote control 400 through a wireless receiver 382. If the packet data is not received, the microcontroller 384 proceeds to step S210. In step S210, the microcontroller 384 detects whether system status information is received from a system. If so, in step S215, the system status information is stored in internal register 384a for storing the information. If the packet data is received, the microcontroller 384 proceeds to step S220. In step S220, the microcontroller detects whether a password included in the received packet data matches a password stored in an EEPROM 386. If not, the remote-control input is ignored.

If the passwords match each other, in step S225, the microcontroller 384 detects whether the system lies in a power-off state. If a remote-control signal is inputted in the power-off state of the system, the microcontroller 384 proceeds to step S230 of FIG. 9B. In step S230, the system is powered on. That is, the microcontroller 384 inputs the power control signal to the system power manager 346 for powering on the system. The system power manager 346 controls the power supply 390, so that power is supplied to the system to start system booting. In step S235, remote driving information and user information are inputted to a keyboard controller 365.

Figure 10:
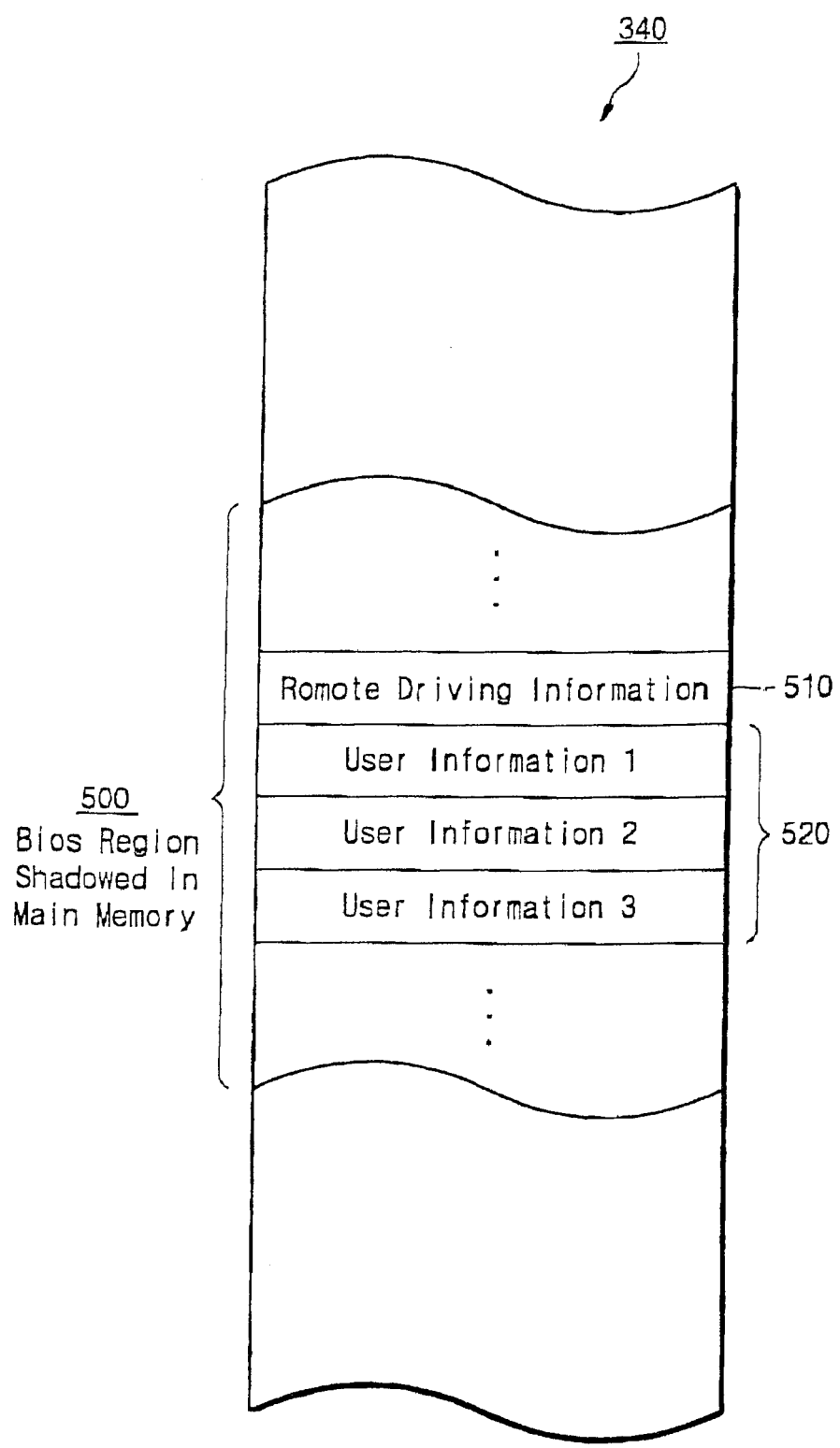
FIG. 10 is a diagram showing a part of a BIOS (basic input/output system) in which remote starting information and user classification code are stored.

As shown in FIG. 10, a BIOS 355 sets the remote driving information to a remote driving information region 510 and stores the inputted multiple user information items in a user information region 520. Such information is used for skipping password inspection of a BIOS and performing auto log-on to an operating system, which will be described more fully hereinbelow.

Figure 9B:
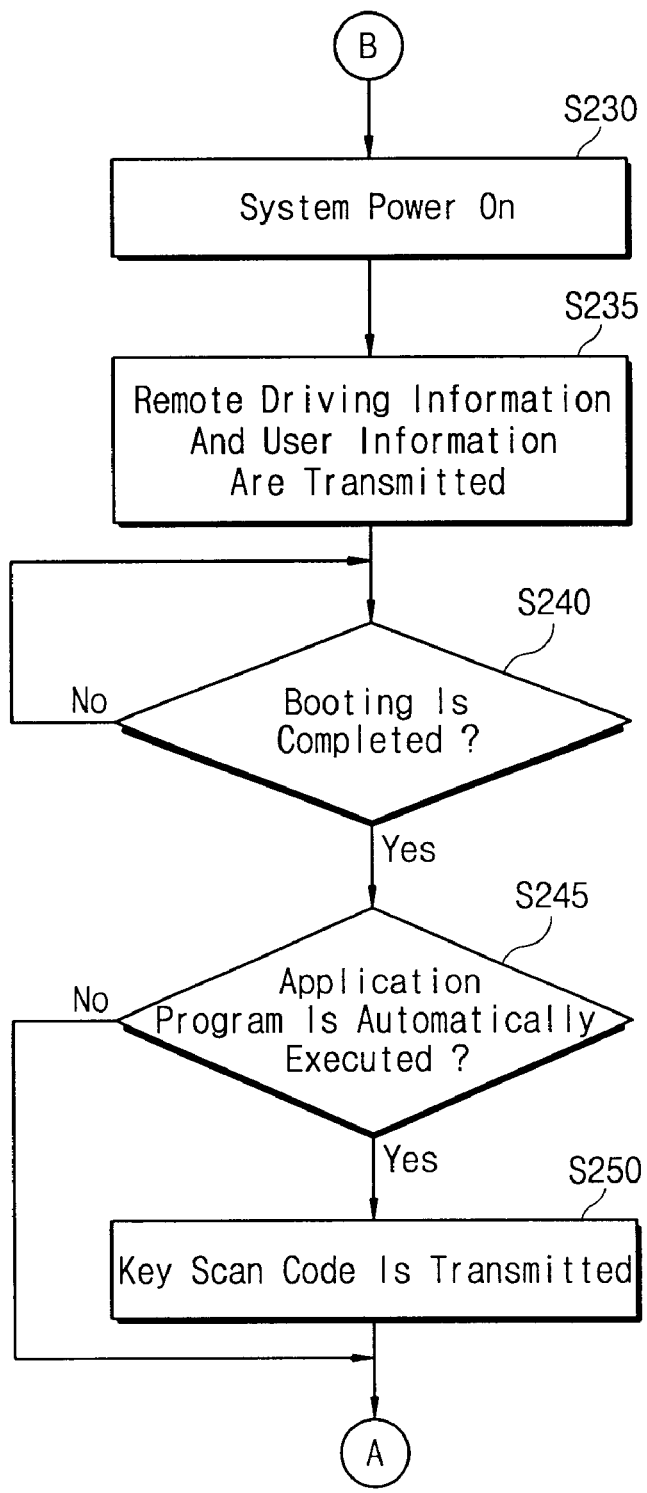

In step S240 of FIG. 9B, the microcontroller 384 detects whether the booting is completed. This is sensed by the system status information initially supplied from shell program 632 after completion of the booting. If the booting is completed, in step S245, the microcontroller 384 determines whether a key code included in the received packet data corresponds to a first button switch 432 or a second button switch 434. If an application program is automatically executed, step S245 is followed by step S250. In step S250, a corresponding key-scan code is inputted to the keyboard controller 365. Therefore, shell program 632 executes a corresponding application program 634.

Figure 9C:
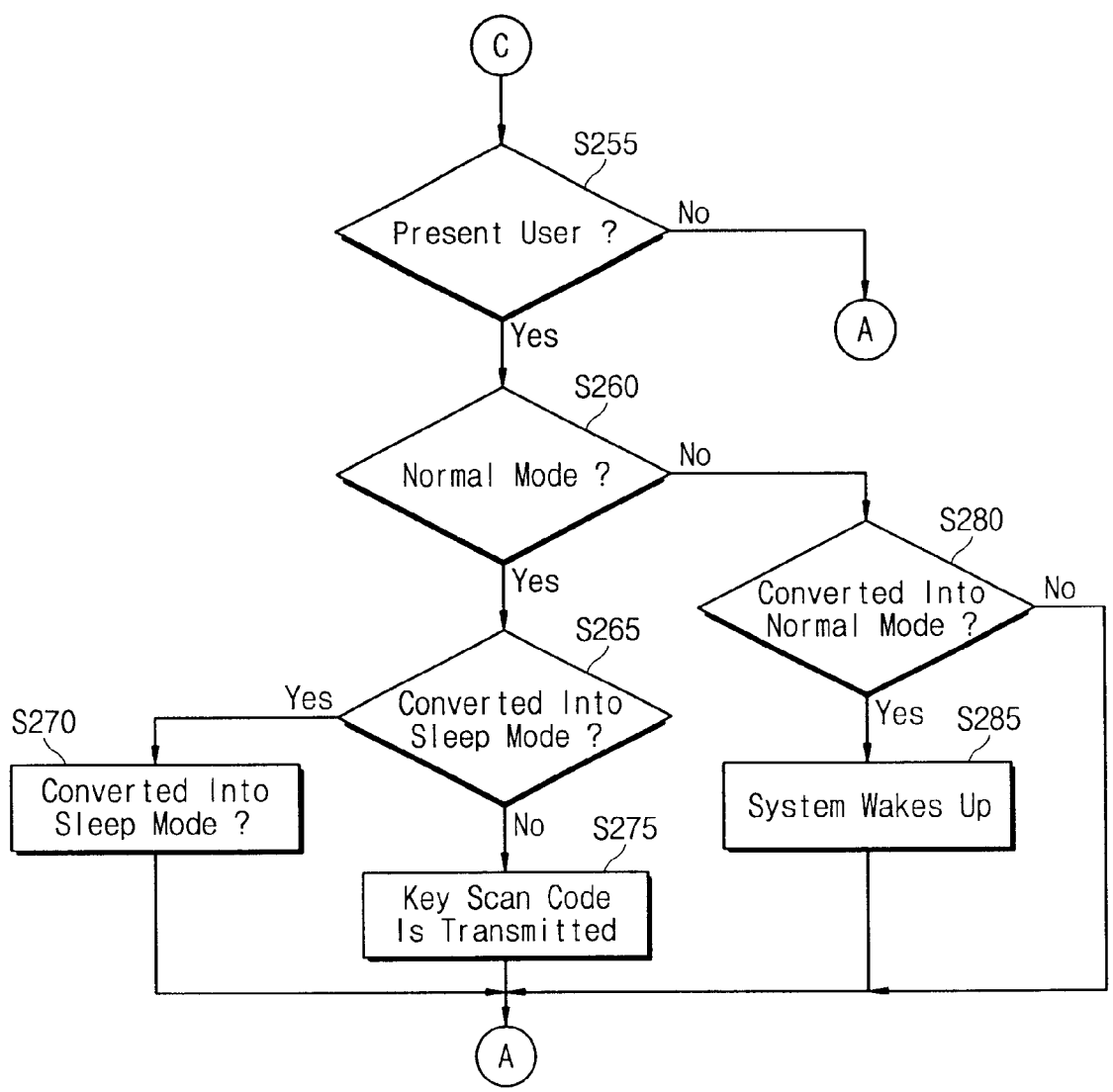

If the system does not lie in a power-off ("sleep") state, step S225 of FIG. 9A is followed by step S255 of FIG. 9C. In step S255, the microcontroller 384 detects whether the control is remote control, which is being used now, from a present user. That is, the microcontroller 384 should detect whether a password included in the present inputted packet data matches a password to be used when the present system is operated or lies in a sleep mode. If not matched to the user password, the remote-control input is ignored. If matched to the user password, in step S260, the microcontroller 384 detects whether the system lies in a normal mode. If the system lies in the normal mode, step S260 is followed by step 265. In step S265, the microcontroller 384 detects whether the control is a remote control for sleep mode conversion. That is, the microcontroller 384 detects whether a key code included in the received packet data is a key code corresponding to the first button switch 430. If the key code is for sleep mode conversion, the microcontroller 384 converts the system into a sleep mode in step S270. On the other hand, if the key code is not for converting to the sleep mode, the key scan code is transmitted in step S275. If step S260 determines that the system is not in normal mode, but rather is in sleep mode, step S260 is followed by step S280. If step S280 determines that the key code is for converting it into the normal mode, step S280 is followed by step 285. In step 285, the microcontroller 384 wakes up the system. That is, the microcontroller 384 inputs a power control signal for waking up the system to the system power manager 346. If the system is in the sleep mode, and conversion to normal mode is not indicated in step S280, input of a second button switch 432 or a third button switch 434 for executing an application program is ignored. However, it is possible to wake up the system and execute a corresponding application program in response to the input of the second button switch 432 or the third button switch 434.

Figure 11:
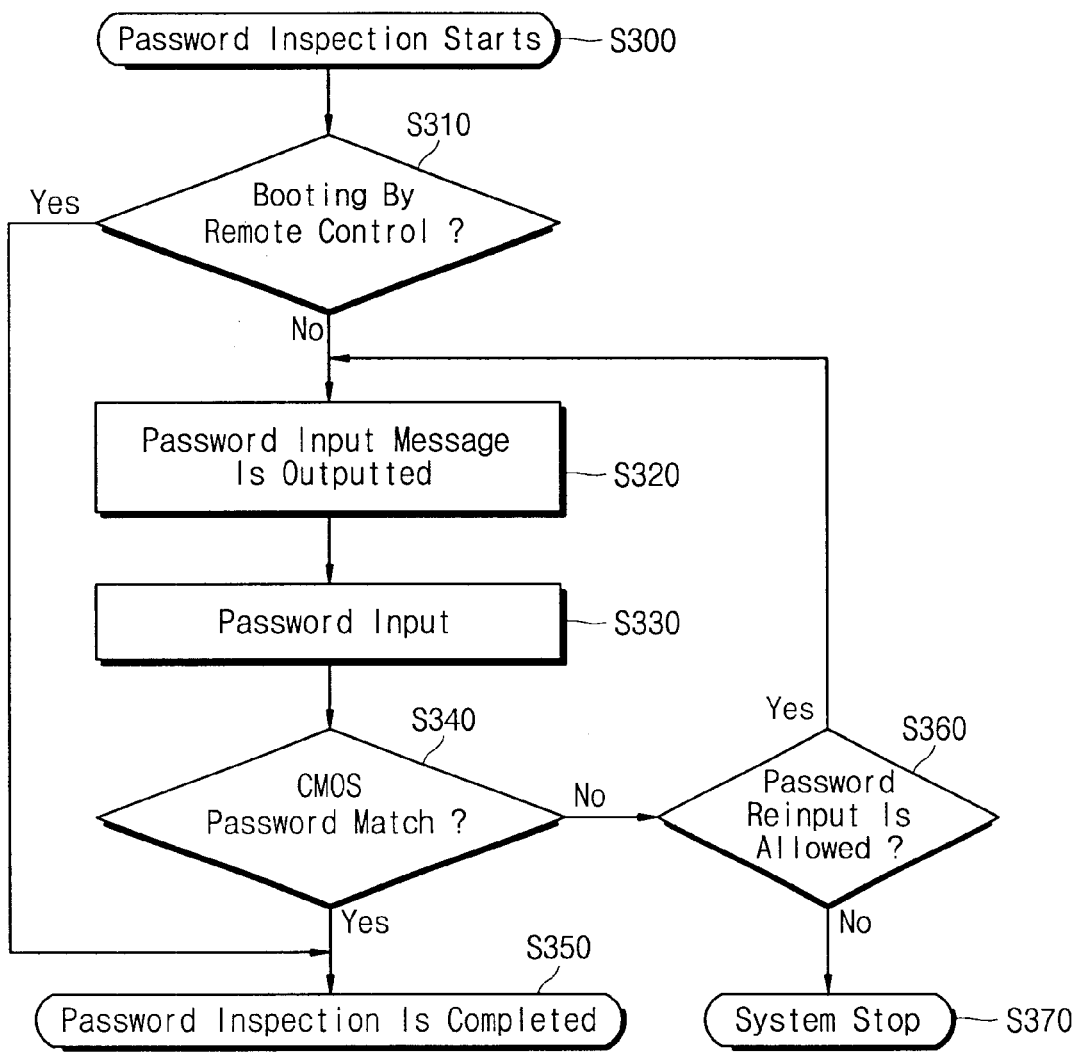
FIG. 11 is a flowchart showing the operation steps of password inspection by a BIOS per FIG. 8.

FIG. 11 illustrates inspection steps of a BIOS of FIG. 8. Referring now to FIG. 11, if a password inspection function is set during system booting, a BIOS 355 performs a password inspection routine. In step S300, the password inspection routine is started. In step S310, the BIOS 355 detects whether the booting is performed by remote control. In the step S310, the BIOS 355 detects whether remote driving display information is set to the above-mentioned remote driving information region 510 of a BIOS region 500 (FIG. 10. If set, a password inspection function is skipped and step S310 is followed by step S350. In step S350, the password inspection is completed. If not remote control, the BIOS 355 outputs a password input message to a display monitor 200 in step S320, receives a password from a user in step S330, and detects whether the received password matches a password stored in a CMOS in step S340. If not matched, the step S340 is followed by step S360. In step S360, the BIOS 355 outputs a password reinput message. In step S370, the system is stopped.

Figure 12:
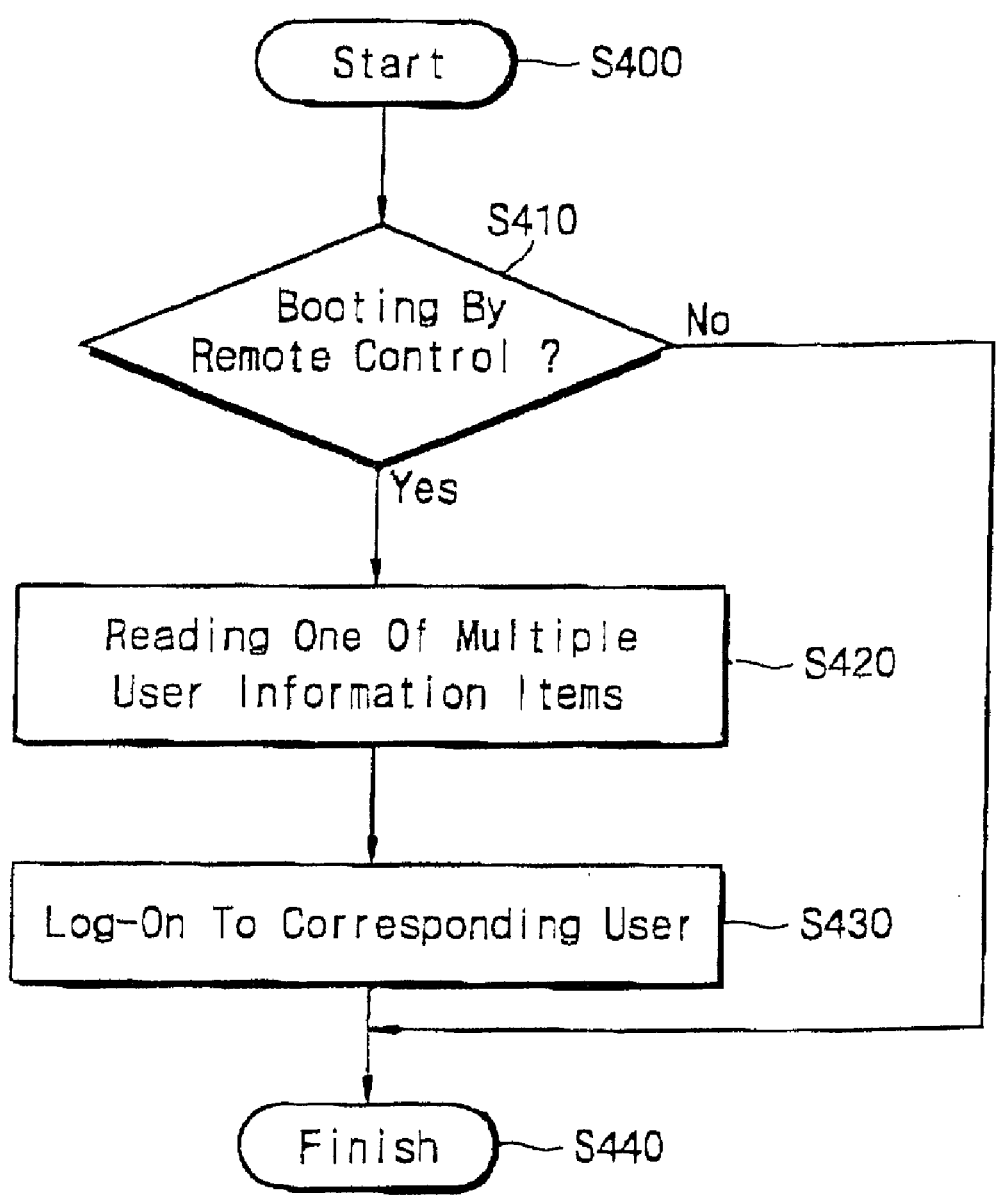
FIG. 12 is a flowchart showing the operation steps of an auto log-on program per FIG. 8.

FIG. 12 illustrates operation steps of an auto log-on program of FIG. 8. If booting is completed by means of a BIOS 355, booting by an operating system proceeds to execute an auto log-on program before log-on to the operating system. In step S400, the auto log-on program start auto log-on operation. In step S410, a microcontroller 384 detects whether the booting is performed by remote control. If so, step S410 is followed by step S420, wherein one of the multiple user information items is read out from a user information region 520 in a BIOS region 500, and a user ID and a password corresponding to the user information read out is inputted to the operating system for performing auto log-on of the system. The corresponding user is logged on in step S430, and the process is completed in step S440. An auto log-on program has Ids and passwords for multiple users. At step S410, if the booting is not performed by a remote control, no auto log-on operation is performed. An auto log-on program has an ID and password for multiple users.

Figure 13:
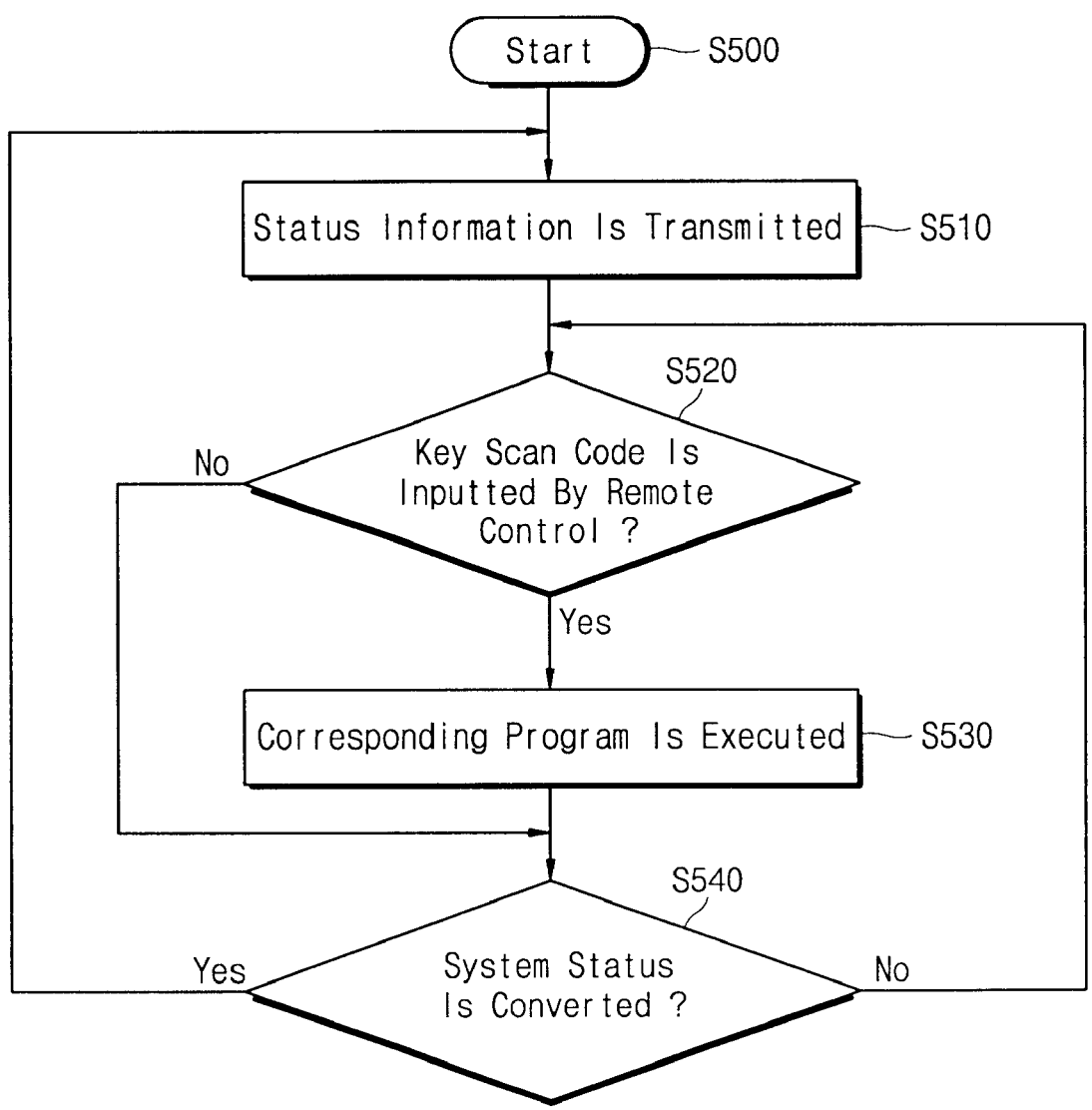
FIG. 13 is a flowchart showing the operation steps of a shell program per FIG. 8.

FIG. 13 illustrates operation steps of a shell program of FIG. 8. Referring now to FIG. 13, if a log-on course is completed to an operating system to complete the booting, a shell program 632 is executed. In step S500, operation of the shell program 632 starts. In step S510, as mentioned above, system status information is inputted to a microcontroller 384 of a wireless receiving panel through a GPIO 347. In step S520, the microcontroller 384 detects whether a key scan code by remote control is inputted through a virtual keyboard driver 622. If inputted, step S520 is followed by step S530. In step S530, a corresponding program is executed. In step S540, the microcontroller 384 then detects whether a system status is converted. If converted, step S540 is followed by step S510. If not converted, step S540 is followed by step S520.

The shell program 632 executes the corresponding application program according to inputted key scan code data. If the system status is converted, the converted system is supplied to the microcontroller 384 through the converted system status information. For example, if a normal mode is converted into a sleep mode or a power off mode, information of the converted mode is provided to a microcontroller 384. If the sleep mode or the power off mode is converted into the normal mode, the information is also provided thereto. A user can selectively register an application program to commence executing when signaled by means of a remote controller. That is, the user can set an application program to begin remotely operating or can input commands or data to it. Therefore, different ones of multiple users can actuate different application programs.

Figure 14:
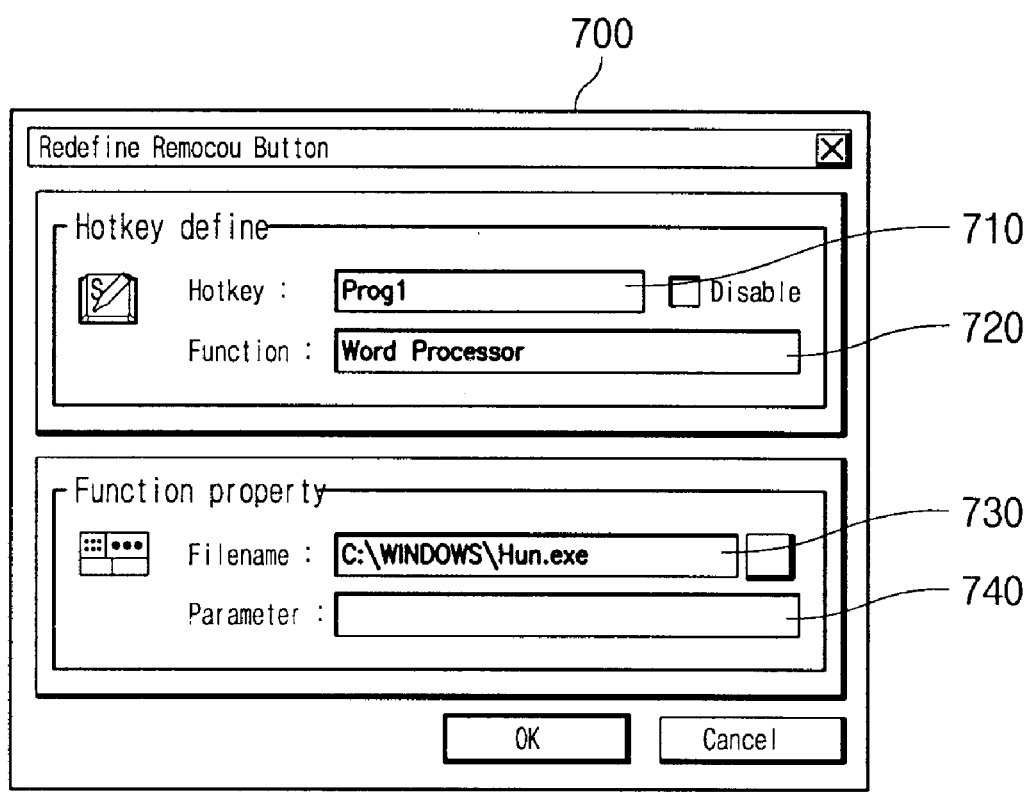
FIG. 14 is a diagram showing a window of a shell program per FIG. 8.

FIG. 14 illustrates a window of the shell program of FIG. 8. Referring now to FIG. 14, a shell program window 700 includes application program registry items, such as a name registry item 710, selected by a second and a third button switches 432 and 434 of a remote control 400; a description item 720 of a corresponding application program; a directory designation item 730 identifying a directory in which the corresponding application program is stored; and a run time parameter item 740 provided in execution of an application program. A user can register an application program by using the respective items of the shell program window 700 and can execute the registered application program by means of a remote control 400. Although the number of application programs that can be registered and executed by the user is limited to two kinds, as illustrated here, it is apparent to those skilled in the art that the number can be increased by conventional expedients.

Users using a multiple user computer system each have an inherent remote controller, so that they can conveniently use a PC remotely. Each remote controller has its own password, for security. Moreover, it is possible to perform batch processing of an application program from system booting to execution of a required application program, using conventional expedients, thereby preventing delays caused by password input and log on to the operating system.

While the invention has been described in connection with specific and preferred embodiments thereof, it is capable of further modifications without departing from the spirit and scope of the invention. This application is intended to cover all variations, uses, or adaptations of the invention, following, in general, the principles of the invention and including such departures from the present disclosure as come within known or customary practice within the art to which the invention pertains, or as are obvious to persons skilled in the art, at the time the departure is made. It should be appreciated that the scope of this invention is not limited to the detailed description of the invention hereinabove, which is intended merely to be illustrative, but rather comprehends the subject matter defined by the following claims.

What is claimed is:

1. A multiple-user computer system, comprising:
   a computer;
   at least one remote-control device adapted to emit a remote-control wireless signal, said remote-control wireless signal containing a control-code signal for remotely controlling the computer to execute a computer program operation, and a password datum signal representative of a password datum uniquely associated with an authorized user of the computer system; and
   a wireless receiving panel operatively coupled to the computer for receiving said remote-control wireless signal from said remote-control device, said panel comprising a detector for detecting whether the remote-control wireless signal contains said password datum signal, and for responding to detection of said password datum signal for enabling input to the computer of a signal representative of said control-code signal, thereby causing the computer to execute said computer program operation;

wherein said at least one remote-control device comprises a switch for actuating remote control of the computer program operation in said computer upon closure of said switch and a control unit connected to said switch for generating said password datum signal when said switch is closed.

2. A system according to claim 1, said system having a password-inspection function wherein the password datum included in the received electrical signal is compared to the password datum stored in said memory unit of said wireless receiving panel, said system further comprising a sensor for sensing power-on of said system by said remote-control device, wherein when said sensor senses power-on of said system by said remote-control device, said password-inspection function is skipped.

3. The system of claim 1, wherein:

when said system is sensed to be in a normal operation state, said control unit inputs to the computer a signal corresponding to the control-code signal contained in said received remote-control wireless signal, thereby causing the computer to execute the computer program operation.

4. The system of claim 1, wherein:

said control unit receives system status information with respect to system operation status from said computer;

when said system is in a power-off state, said control unit powers on said system when the password datum signal contained in the remote-control wireless signal matches a password datum stored in a memory unit of said wireless receiving panel.

5. The system of claim 4, wherein:

when said system is sensed to be in a normal operation state, said control unit inputs to the computer a signal corresponding to the control-code signal contained in said received remote-control wireless signal, thereby causing the computer to execute the computer program operation.

6. The system of claim 1, wherein said at least one remote-control device comprises:

a memory unit for storing the password datum uniquely associated with the authorized user of the computer system; and a wireless transmitter operatively coupled to said control unit for emitting the remote-control wireless signal including said password datum signal in response to closure of said switch.

7. The system of claim 6, wherein said switch comprises:

a first switch for converting a system status into a power-on/sleep mode; and at least one further switch for commanding execution of a program stored in said system.

8. The system of claim 1, wherein said wireless receiving panel comprises:

a wireless receiver for receiving the remote-control wireless signal from said remote-control device and for converting the remote-control wireless signal into an electrical signal representative of the wireless remote-control signal;

a memory unit for storing at least one password datum of the authorized user; and a control unit connected to said wireless receiver and to said memory unit for receiving said electrical signal from said wireless receiver and, when said electrical signal contains a signal representative of a password datum stored in said memory unit, transmitting to the computer a signal representative of the control-code signal contained in the remote-control wireless signal, thereby causing the computer to execute the computer program operation.

9. The system of claim 8, wherein:

said control unit receives system status information with respect to system operation status from said computer;

when said system is in a power-off state, the control unit powers on said system when a password datum included in the received electrical signal matches the password datum stored in said memory unit of said wireless receiving panel; and when said system is sensed to be in a normal operation state, said control unit inputs to the computer a signal corresponding to the control-code signal contained in said received remote-control wireless signal, thereby causing the computer to execute the computer program operation.

10. The system of claim 9, wherein, when said multiple-user system is being operated by a user, said control unit transmits said signal corresponding to the control-code signal to said computer when and only when said password datum matches a password datum of an authorized user presently operating the computer.

11. A method for remotely controlling a computer system from a plurality of remote-control devices, each device being assigned to a respective one of a plurality of multiple users, said method comprising the steps of:

(a) receiving a remote-control signal from one of the remote-control devices;

(b) detecting whether the received remote-control signal contains a password signal representative of a password datum associated with a respective one of authorized multiple users; and (c) when a said password signal is detected, executing computer system operations corresponding to a control code contained in said received remote-control signal;

said method further comprising the steps of:

detecting whether said computer system is in a power-on state or a power-off state;

when said remote control signal is received from an authorized user when said system is in a power-off state, powering on said system; and after said computer system is powered on, executing system operations corresponding to said control code contained in said received remote-control signal.

12. The method of claim 11, further comprising the step of detecting whether said remote-control device has powered on said computer system and, if so, skipping step (b).

13. A remote control device for use with a multiple-user computer system, said device comprising:

a memory unit for storing a password datum uniquely associated with an authorized user of the system;

a switch for actuating remote control of a computer program operation in said computer upon closure of the switch;

a control unit connected to said switch and connected to said memory unit, said control unit generating a control signal containing a signal representative of said password datum when said switch is closed; and a wireless transmitter operatively coupled to said control unit for emitting a remote-control wireless signal representative of said control signal in response to closure of said switch.

14. The device of claim 13, wherein:

when said system is sensed to be in a normal operation state, said control unit inputs to the computer a signal corresponding to the control-code signal contained in said received remote-control wireless signal, thereby causing the computer to execute the computer program operation.

15. The device of claim 13, wherein:

said control unit receives system status information with respect to system operation status from said computer;

when said system is in a power-off state, said control unit powers on said system when the password datum signal contained in the remote-control wireless signal matches a password datum stored in a memory unit of said wireless receiving panel.

16. The device of claim 15, wherein:

when said system is sensed to be in a normal operation state, said control unit inputs to the computer a signal corresponding to the control-code signal contained in said received remote-control wireless signal, thereby causing the computer to execute the computer program operation.

17. A receiving panel for use in a multiple-user computer system, said panel comprising:

a wireless receiver for receiving a wireless signal from a remote control device and for converting the wireless signal into an electrical signal representative of the wireless signal;

a memory unit for storing at least one password datum of an authorized user; and a control unit connected to said wireless receiver and to said memory unit for receiving said electrical signal from said wireless receiver and, when said electrical signal contains a signal representative of a password datum stored in said memory unit, transmitting to the computer a signal representative of a control-code signal contained in the wireless signal, thereby causing the computer to execute a predetermined computer program operation;

wherein said remote control device comprises a switch for actuating remote control of the computer program operation in said computer upon closure of said switch, and a control unit connected to said switch for generating said password datum signal when said switch is closed.

18. The receiving panel of claim 17, wherein:

when said system is sensed to be in a normal operation state, said control unit inputs to the computer a signal corresponding to the control-code signal contained in said received remote-control wireless signal, thereby causing the computer to execute the computer program operation.

19. The receiving panel of claim 17, wherein:

said control unit receives system status information with respect to system operation status from said computer;

when said system is in a power-off state, said control unit powers on said system when the password datum signal contained in the remote-control wireless signal matches a password datum stored in a memory unit of said wireless receiving panel.

20. The receiving panel of claim 19, wherein:

when said system is sensed to be in a normal operation state, said control unit inputs to the computer a signal corresponding to the control-code signal contained in said received remote-control wireless signal, thereby causing the computer to execute the computer program operation.

* * * * *